(12) United States Patent
Xue et al.

(10) Patent No.: US 6,541,146 B1
(45) Date of Patent: Apr. 1, 2003

(54) COMPOSITE SEALANT MATERIALS BASED ON REACTING FILLERS FOR SOLID OXIDE FUEL CELLS

(75) Inventors: Liang A. Xue, Randolph, NJ (US); James Piascik, Randolph, NJ (US); Jean Yamanis, Morristown, NJ (US)

(73) Assignee: Hybrid Power Generation Systems, LLC, Los Angeles, CA (US)

( * ) Notice: Subject to any disclaimer, the term of this patent is extended or adjusted under 35 U.S.C. 154(b) by 171 days.

(21) Appl. No.: 09/708,334

(22) Filed: Nov. 7, 2000

(51) Int. Cl.[7] ................................................ H01M 8/04
(52) U.S. Cl. .............................. 429/35; 429/30; 429/32; 429/36
(58) Field of Search .............................. 429/35, 36, 30, 429/32

(56) References Cited

U.S. PATENT DOCUMENTS

| 5,368,667 A | 11/1994 | Minh et al. |
| 5,453,551 A | 9/1995 | Lacroix et al. |
| 5,750,279 A | 5/1998 | Carolan et al. |
| 5,807,642 A | 9/1998 | Xue et al. |
| 5,868,918 A | 2/1999 | Adler et al. |
| 6,042,703 A | * 3/2000 | Adler et al. ................. 204/252 |
| 6,165,632 A | * 12/2000 | Blum et al. .................... 429/12 |
| 6,402,156 B1 | * 6/2002 | Schutz et al. ................ 277/316 |

FOREIGN PATENT DOCUMENTS

| EP | 620608 A1 | * 10/1994 | .......... H01M/08/02 |

* cited by examiner

*Primary Examiner*—Carol Chaney
(74) *Attorney, Agent, or Firm*—Sutherland, Asbill & Brennan LLP

(57) ABSTRACT

A composite sealant for in-situ sealing a fuel cell stack is provided. A paste of the sealant mixture is initially formed by mixing a glass precursor powder and a reacting filler material. The sealant mixture paste is applied to selected sealing locations of the fuel cell stack. The sealant mixture paste is then transformed into a composite sealant material to seal the selected sealing locations by heat treatment in air to about 900° C. The composite sealant material comprises a glass matrix phase and a reinforcing phase including a plurality of interlocked elongated single crystal grains. The reacting fillers modify the CTE and significantly improve the gap filling capacity of the composite sealant material and provide superior pressure containment capability at elevated temperatures.

15 Claims, 3 Drawing Sheets

COMPOSITE SEALANT MATERIALS BASED ON REACTING FILLERS FOR SOLID OXIDE FUEL CELLS

BACKGROUND OF THE INVENTION

The present invention generally relates to fuel cell fabrication techniques and, more particularly, to fabrication of solid electrolyte planar fuel cells.

A fuel cell is basically a galvanic conversion device that electrochemically reacts a fuel with an oxidant to generate a direct current. A fuel cell typically includes a cathode material, an electrolyte material, and an anode material. The electrolyte is a non-porous material sandwiched between the cathode and anode materials. An individual electrochemical cell usually generates a relatively small voltage. Thus, to achieve higher voltages that are practically useful, the individual electrochemical cells are connected together in series to form a stack. Electrical connection between cells is achieved by the use of an electrical interconnect between the cathode and anode of adjacent cells. The electrical interconnect also provides for passageways which allow oxidant fluid to flow past the cathode and fuel fluid to flow past the anode, while keeping these fluids separated. Also typically included in the stack are ducts or manifolding to conduct the fuel and oxidant into and out of the stack.

The fuel and oxidant fluids are typically gases and are continuously passed through separate passageways. Electrochemical conversion occurs at or near the three-phase boundaries of each electrode (cathode and anode) and the electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Fuel cells with solid electrolytes are the most promising technologies for power generation. Solid electrolytes are either ion conducting ceramic or polymer membranes. In the former instance, the electrolyte is typically made of a ceramic, such as dense yttria-stabilized zirconia (YSZ) ceramic, that is a nonconductor of electrons, which ensures that the electrons must pass through the external circuit to do useful work. With such an electrolyte, the anode is oftentimes made of nickel/NSZ cermet and the cathode is oftentimes made of doped lanthanum manganite.

Perhaps the most advanced construction with ceramic membranes is the tubular solid oxide fuel cell based on cubic zirconia electrolyte. The tubular construction can be assembled into relatively large units without seals and this is its biggest engineering advantage. However, tubular solid oxide fuel cells are fabricated by electrochemical vapor deposition processes, which are slow and costly. The tubular geometry of these fuel cells also limits the specific power density, both on weight and volume bases, to low values. The electron conduction paths are also long and lead to high energy losses due to internal resistance heating. For these reasons, other constructions based on planar cells are actively being pursued.

One alternative of the planar stack construction resembles a cross-flow heat exchanger in a cubic configuration. The planar cross flow fuel cell is built from alternating flat single cell membranes (which are tri-layer anode/electrolyte/cathode structures) and bipolar plates (which conduct current from cell to cell and provide channels for gas flow into a cubic structure or stack). The bipolar plates are oftentimes made of suitable metallic materials. The cross-flow stack is manifolded externally on four faces for fuel and oxidant gas management.

The cross-flow or cubic design, however, requires extensive sealing, both in terms of the number of seal interfaces and the linear size of such interfaces. The latter increases with the stack footprint and leads to serious problems if the metal and ceramic cell parts do not have closely matched thermal expansion coefficients. A significant mismatch in the thermal expansion coefficients leads to thermal stresses that can cause catastrophic failure on cool down from the stack operating temperature.

Internally manifolded radial stack designs require substantially less glass based sealing than the cross-flow design, especially if the required gas streams are introduced into the stack via a central, dual cavity manifold. Advanced radial stack designs have reduced the number of required glass seals to two per cell and one per separator plate, but two of these seals have to be made during stack assembly, are blind seals, and their integrity cannot be inspected and repaired.

The physical integrity and mechanical reliability of sealing cross-flow or radial stacks with glass based sealants is not adequate at the present time. Therefore, in the fabrication of solid oxide fuel cell (SOFC) stacks one of the outstanding material issues is sealants. The sealants for fuel cell stacks must meet several, often competing, property requirements. One of the required properties is that the sealant must have a relatively high coefficient of thermal expansion (CTE) to match that of the stack components such as cells, interconnects and manifold materials. Such stack components typically have CTEs ranging from about 9 to $15 \times 10^{-6}/°$ C. at 800° C. Another required property involves the softening point of the sealant. The sealant should have a relatively low softening point (i.e., desirably about 400 to 700° C.) for thermal stress relief during system shut-down and start-up. Further, viscosity of the sealant should be within a desired range (i.e., desirably about $10^3$ to $10^8$ poise) at the sealing temperature. The sealant should be fluid enough to seal gaps at the sealing temperature while it should be viscous enough at the SOFC operating temperature (700–900° C.) so that gaps are kept sealed under gas pressure differentials. Finally, the sealant must be both thermally stable and chemically stable (negligible weight loss and minimum reaction with stack and manifold materials) in the SOFC operating environments and conditions.

These properties are often very difficult to satisfy using currently available sealants. Of the above given properties, the high CTE and gap-holding capacity are the most difficult to satisfy. Although some commercially available silica based glasses may come close to meeting most of these properties, they generally fall short of meeting the high CTE and gap-holding capacity. These silica-based glasses often fail when an interconnect is made of an high CTE material because such glasses are not able to produce a reliable seal as the thermal expansion mismatch between these two materials leads to part distortion and cracking. Adding to this, it is also known that such glasses cannot seal relatively large gaps, e.g., larger than 1 mm.

As can be seen, there is a need for a better sealant material that judiciously balances all the required properties. In particular, there is a need for a sealant material which has low enough initial viscosity and gap filling capacity as well as pressure containment characteristics to achieve sealing.

SUMMARY OF THE INVENTION

In one aspect of the present invention, a process for sealing a fuel cell stack comprises forming a sealant mixture paste, applying the sealant mixture paste to a selected sealing location of the fuel cell stack and transforming the sealant mixture paste into a sealant mixture material to seal the selected sealing locations. The sealant mixture paste is formed by mixing a glass precursor and a composite microstructure forming agent. The sealant mixture material comprises a glass matrix phase and a reinforcing phase.

In another aspect of the present invention, a sealant material for sealing a fuel cell stack comprises a glass matrix phase and a plurality of elongated grains of a reinforcing phase distributed into the glass matrix phase. The elongated grains are single crystals that are formed as a result of a reaction between a glass precursor material and a composite structure forming material selected from the group consisting of barium titanate, strontium titanate, calcium titanate, and mixtures thereof.

These and other features, aspects and advantages of the present invention will become better understood with reference to the following drawings, description and claims.

DETAILED DESCRIPTION OF THE INVENTION

As will be described hereinbelow, the process of the preferred embodiment provides a novel method to form an in-situ composite sealant material. This composite sealant material has a low enough initial viscosity to achieve sealing and the capacity to convert via chemical reactions to a glass ceramic material, which has excellent gap filling and pressure containment characteristics. The sealant material of the present invention may be developed based on a combination of both composite and transient microstructure approaches. In this context, the term "transient" means (1) transient chemical composition, that is, the chemical composition of both the filler and the glass matrix changes during the sealing operation or heat treating to the sealing temperature, and (2) transient microstructure, that is, during the sealing operation the sealant microstructure evolves from a mixture of amorphous glass with essentially equiaxed filler particles to a crystallized glass-ceramic composite wherein elongated or needle-like or acicular single crystal grains reinforce a surrounding glass matrix. The sealant mixture of the present invention comprises a glass component which accomplishes the sealing function, and reacting fillers which modify the sealant microstructure to a glass ceramic by reacting with the glass to yield new crystalline phases in a residual glass matrix. The crystalline phases take the form of elongated or needle-like or acicular single crystal grains, which improve the gap filling capacity of the composite sealant material as well as pressure containment without affecting the material's sealing characteristics. The reacting fillers also modify the CTE of the glass component from about 9 to $13 \times 10^{-6}/°$ C.

Figure 1:
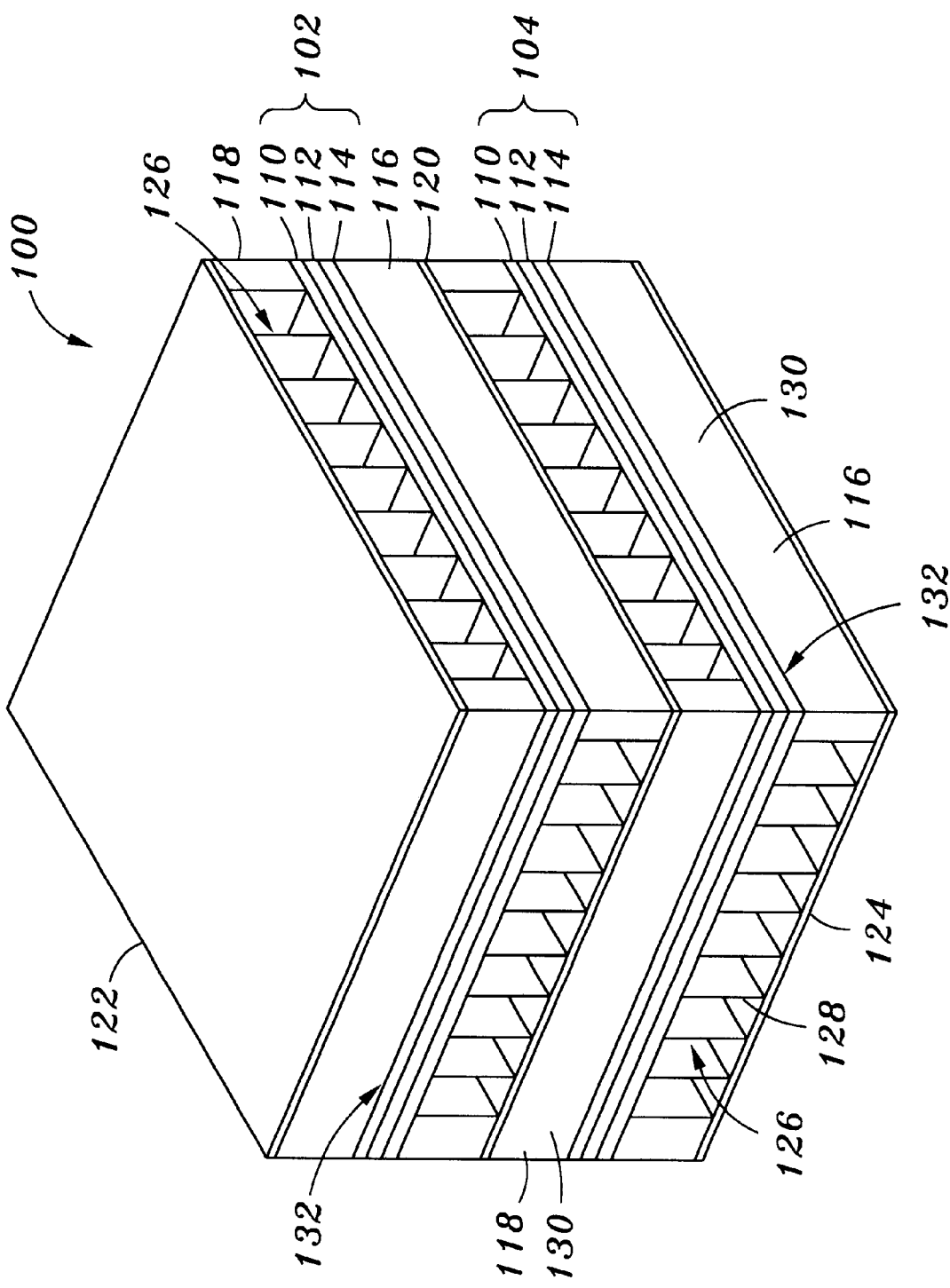
FIG. 1 is a schematic perspective view of an exemplary fuel cell stack.

Reference will now be made to the drawings wherein like numerals refer to like parts throughout. An exemplified application of the sealant material of the present invention can be described with respect to FIGS. 1 and 2. FIG. 1 shows an exemplary fuel stack 100 comprising fuel cells 102 and 104. Each fuel cell 102, 104 comprises a cathode 110, a solid electrolyte 112 and an anode 114 respectively. Further, each cell 102, 104 is interposed between an anode-side interconnect 116 and a cathode-side interconnect 118. Interconnects 116 and 118 are separated by a separator plate 120. In this example, a top endplate 122 covers a top surface of the cathode side interconnect 118 of the fuel cell 102 while a bottom end plate 124 covers a bottom surface of the anode side interconnect 116 of the fuel cell 104. The endplates 122 and 124 are the current collectors of the stack 100 and permit current flow during the operation of the stack 100.

The interconnects 116 and 118 comprise a plurality of openings 126 for introducing the fuel and oxidant gas into the fuel cells 102 and 104. In this example, the openings 126 are formed as parallel channels separated by divider walls 128 extending along the cells 102, 104. As shown in FIG. 1, each interconnect 116, 118 terminates with two side-walls 130 which are parallel to divider walls 128 defining openings 126. In this embodiment, intersections 132 formed between the side-walls 130 and the cells 102, 104 must be sealed to prevent oxidant gas and fuel mixing, that leads to combustion and higher temperatures, which result in catastrophic device failures.

While the fuel cell stack 100 and its components are described in a preferred embodiment as being square in overall configuration, the present invention contemplates that other configurations, such as polygonal or circular, are within the scope of this invention and can be utilized. The fuel cell stack 100 is generally applicable for the use of solid electrolytes. Accordingly, the present invention contemplates that the fuel cell stack 100 can be used in the context of at least solid oxide fuel cells which are well known in the art. For the purpose of clarity, in this embodiment, the stack 100 has only two cells. However, it is within the scope of this invention that a plurality of fuel cells can be stacked vertically to form a stack with a multitude of cells.

Figure 2:
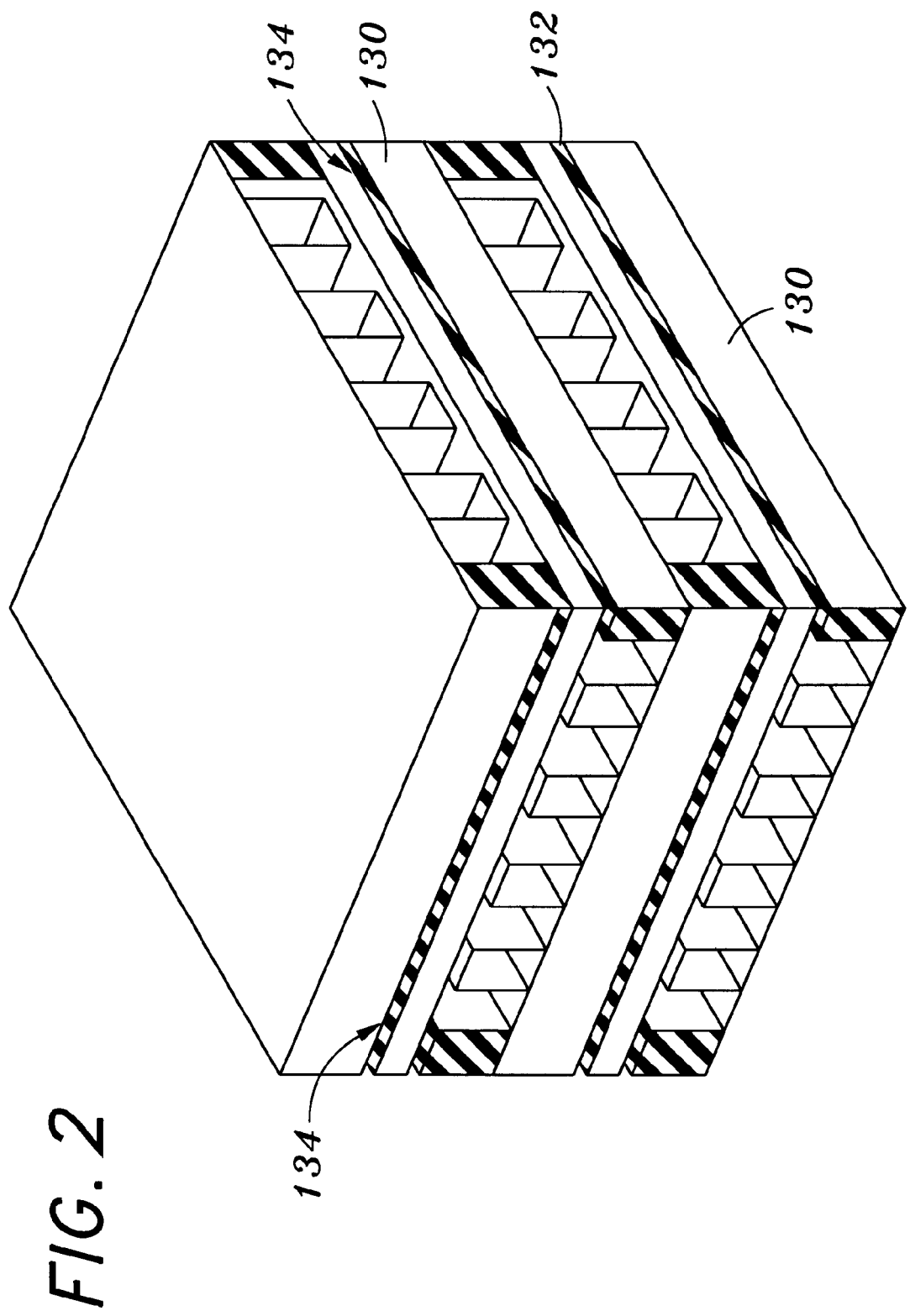
FIG. 2 is a schematic perspective view of an exemplary fuel cell stack shown in FIG. 1 wherein a composite sealant of the present invention has been applied to sealing locations of the stack.

As shown in FIG. 2, a sealant 134 of the present invention may be formed along the intersections 132 to effect a gas and fuel tight seal at the intersections 132. In accordance with the principles of the present invention, the sealant 134 is comprised of a composite sealant material. The structure of the composite sealant 134 is shown schematically on a microscopic level in FIG. 3.

Figure 3:
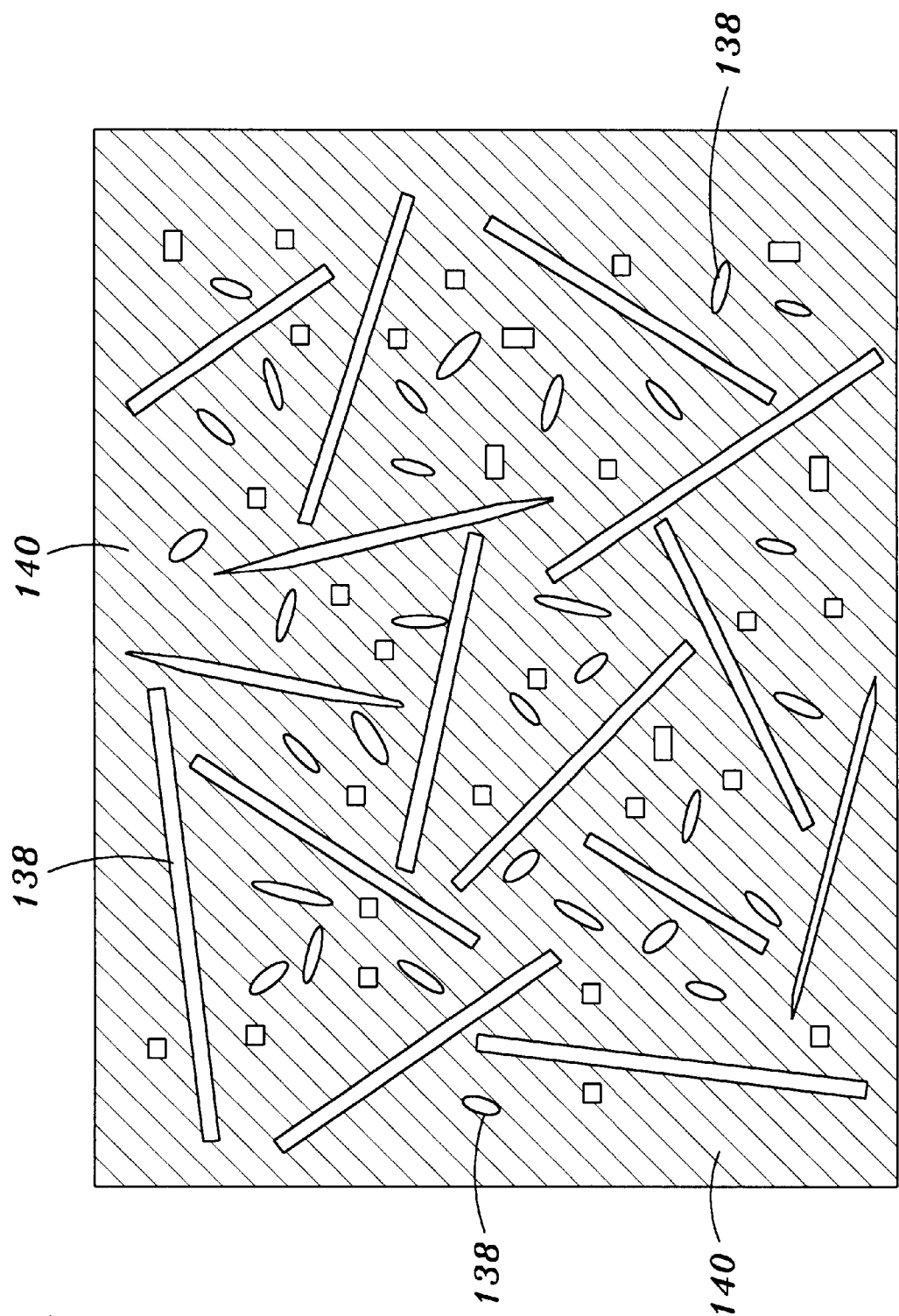
FIG. 3 is a highly magnified schematic illustration of the structure of the composite sealant of the present invention.

As shown in FIG. 3, the structure comprises a predetermined mixture of at least two phases comprising a crystalline phase 138 and a mostly amorphous phase 140. In this embodiment, the crystalline phase 138 comprises elongated or acicular (needle-shape) grains which are distributed into the mostly amorphous phase 140 which forms the matrix of the composite structure. In FIG. 3, the elongated grains 138 form an interlocked microstructure or a network of interlocked elongated grains and thereby reinforce the matrix 140. As shown in FIG. 3, rectangular or oval shapes represent the grains that are not parallel to the plane of the paper. As will be described more fully below, the elongated grains 138 are formed as a result of a reaction between the titanate based reacting fillers and the matrix material at a temperature range of about 700–950° C. In this respect, if barium titanate reacting fillers are used, the elongated grains 138 may be comprised of $BaTiSi_2O_8$, $BaTiSiO_5$, $Ba_2ZnTi_5O_{13}$, $BaZn_2Ti_5Si_2O_7$, $K_2ZrSi_3O_9$, $BaSi_2O_5$, or mixtures thereof, with each individual grain being single crystal. The elongated grains 138 may have a length in the range of about 2 to 200 microns, preferably about 5 to 50 microns. An aspect ratio may be in the range of about 2 to 100 microns, preferably about 5 to 30 microns. The matrix 140, which constitutes the major component of the composite sealant 134, may be comprised of residual glass.

As will be described more fully below in the Examples, the preparation of the composite sealant 134 of the present invention may initially begin by direct mixing of glass matrix precursor powders with composite forming agents, such as reacting filler powders, in a desired ratio. Examples of the glass matrix precursor materials used include, but are not limited to, Corning 3130 and Corning 4060 glasses. Both materials are silica-based glasses containing significant amounts of zinc oxide and alkali metal oxides. Corning 3103 contains potassium and lithium oxides, while Corning 4060 contains potassium and sodium oxides, which are available from Corning Corporation. It is understood that the glass component of the resulting sealant accomplishes the sealing function while the reacting fillers modify the sealant microstructure into a composite structure and improve the CTE of the sealant as well as improve the gap filling capacity of the sealant. Examples of materials used as reacting fillers are materials from the group known as titanates. Preferred titanates for the present invention include barium titanate, strontium titanate and calcium titanate, and their solid solutions or mixtures thereof having the general chemical formula $Ba_{1-x-y}Ca_xSr_yTiO_3$, where $x+y \leq 1$. Preferably, the sealant mixture paste is formulated to contain a ratio of reacting-filler to glass material ranging from about 1:30 to 2:1, more preferably about 1:10 to 2:3. If desired, others materials may also be present in the paste formulation.

For example, additional fillers, such as metal and ceramic powders or fibers, may also be added to this mixture to further modify the sealing properties of the composite sealant 134. Examples of common metal fillers may comprise alloy powders having a composition of about 12–77 wt. % Ni, 3–65 wt. % Fe, 16–23 wt. % Cr, 0–15 wt. % W, 0–6 wt. % Co, 0–5 wt. % Al, 0–3 wt. % Mo, 0–3 wt. % Mn, 0–2 wt. % Si, and 0–1 wt. % Y. The ceramic fillers are primarily refractory materials such as zirconia, alumina, mullite and the like. Although less refractory, silica may also be used as a ceramic filler material. So long as compatibility exists with the materials of the components of the fuel cell 100 and the materials of the sealant, mixtures of such compatible materials may also be used to formulate the sealant mixture paste of the present invention.

Such prepared sealant mixture is then applied to the intersections 132 or other sealing locations on the fuel cell stack 100, shown in FIG. 1 and 2. The application process may be carried out either directly in the form of powder or, preferably, as a paste. The paste is formed by blending the powders that make up the sealant mixture with a solvent/binder system such as terpineol (a solvent) and Heraeus V-006 (solvent with binder, comprising of terpineol and a trade secret binder system). Terpineol and Heraeus V-006 are readily commercially available e.g., the former from Aldrich, the latter from Heraeus. Typically, the solvent content of the sealant mixture paste ranges from about 5 to 50%.

In one preferred preparation method, the sealant mixture paste may be prepared by first mixing the glass powder with a solvent/binder system such as terpineol and Heraeus V-006. The reacting filler powders and additional filler powders are then added to make the sealant mixture paste. In another preferred embodiment, the glass powder is first mixed with the solvent/binder system to form a first paste. The reacting filler powders and additional filler powders are then mixed with a solvent/binder system to form a second paste. The two pastes are then mixed to make the final sealant mixture paste.

In the preferred embodiment, once prepared, the sealant mixture paste is first applied to the intersections 132 on the fuel cell stack 100. The paste is then cured by heating the stack up from room temperature to about 400° C. in air using a heating rate of about 2° C. per minute. The stack 100 is kept at about 400° C. in air for about 2 hours to burn off the binder and residual organics in the sealant mixture paste. The cured paste then heated up at about 2° C. per minute to about 900° C. and held at about 900° C. for about 25–30 minutes so as to allow the cured sealant mixture paste to first melt and accomplish the sealing process. At this temperature range, the reactive fillers start to react with the glass to generate crystalline phases that form into single crystal grains having elongated or needle-like or acicular morphology that are surrounded by a residual glassy matrix, and this constitutes the in-situ formed composite sealant of the present invention.

In the following process step, the temperature is lowered to about 800° C., which is the SOFC operating temperature in this example, at a rate of about 3° C. per minute and held at this temperature range throughout the operation cycle of the fuel cell stack 100. At the operating temperature of the stack 100, the elongated single crystal grains new crystalline phases may continue to grow until their growth is eventually stopped by other grains via impingement.

The aforementioned process of the preferred embodiment of the present invention provides a novel method to form a composite sealant material in-situ. The sealant mixture as it is heated up has initially a low enough viscosity (i.e., about $10^3$ to $10^8$ poise and preferably about $10^4$ to $10^6$ poise) to seal gaps between substrates and the inherent capacity to subsequently form, via chemical reactions, new crystalline phases that have an elongated grain morphology and lead to a composite sealant having a reinforced microstructure and excellent gap filling and pressure containment attributes. The single crystal acicular grains are the reinforcing elements in the composite sealant providing enhanced resistance to flow at the stack operating temperature. The composite sealant material of the present invention can seal wide gaps and contain pressures up to 6.5 psig at 800° C. in gaps of 0.034 inches wide. The containment of this high pressure at 800° C. and such wide gaps without leakage is undoubtedly due to the reinforcement that the in-situ formed elongated single crystal grains provide to the glass matrix.

EXAMPLES

It will be understood that this invention is susceptible to modification in order to adapt it to different uses and conditions. The following examples are given for illustrative purposes only and are not intended to impose limitations on the subject invention.

Example 1

60 grams of Corning 4060 glass powder was blended with 15 grams of a solvent/binder system (Alpha-terpineol/Heraeus V-006, 55:45 ratio) to make a paste. To 10 grams of this paste 0.89 grams of barium titanate powder was added and mixed to make the sealant mixture paste. The sealant mixture paste can be applied to the places in the fuel cell stack 100 to be sealed and then heated to a temperature higher than the softening point of the glass, e.g., about 800° C., for the composite sealant to make the seal.

Example 2

80 grams of barium titanate powder was blended with 20 grams of a solvent/binder system (Alpha-terpineol/Heraeus V-006, 55:45 ratio). To 21 grams of the Corning 4060 paste of Example 1, 9 grams of the barium titanate paste was added and mixed to make the sealant mixture paste.

The sealant mixture paste thus prepared was first applied to the intersections of a fuel cell stack. The paste was dried and then cured by heating the stack up from room temperature to about 400° C. using a heating rate of about 2° C. per minute. The stack was kept at about 400° C. for about 2 hours to mainly remove the binder and organic in the paste. The stack was then heated up at about 2° C. per minute to about 900° C. and held at about 900° C. for about 25–30 minutes so as to allow the sealant to partially melt and accomplish the sealing process. At this temperature range, the barium titanate reactive fillers started to react with the glass to generate new reaction products that formed the base for the development of the single crystal elongated grains.

The stack temperature was then lowered to about 800° C., which was the SOFC operating temperature in this example, at a rate of about 3° C. per minute and held at this temperature range throughout the operation cycle of the fuel cell stack.

Example 3

Samples of the sealant mixture paste prepared in Example 2 were heat-treated to various hold temperatures in the range of 700° to 950° C. for various hold times. Cooled sealant samples from these experiments were sectioned and polished for characterization by scanning electronic microscopy (SEM). The samples were also examined by X-Ray Diffraction analysis. As a result of these experiments, it has been found that new crystalline phases are formed by reaction of the glass component of the sealant mixture with the barium titanate component. The crystalline phases form into single crystal grains that have elongated, or needle-like or acicular, morphology and these single crystal grains form initially at a fast rate, then at slower rate until grain impingement stops the grain growth altogether. It has been found that a hold temperature in the range of 700–900° C. result in optimal density and size for these single crystal elongated grains and this is a preferred temperature range the composite sealant of the present invention. Higher operating temperatures do not favor the formation of these single crystal elongated grains, and lower temperatures slow down the growth rate too much. For these grains, undermining the pressure holding capacity of the sealant.

Example 4

A solid bar of the composite sealant was also prepared by heat treating the sealant mixture paste and the experimental conditions of Example 2 for measuring the thermal expansion coefficient (CTE) of this material. The measured average CTE value for the composite sealant (fired to 900° C. for 30 minutes and cooled down) was $10.43 \times 10^{-6}/°$ C. from room temperature to 600° C. After further annealing the as-fired composite sealant at 800° C. for 550 hours, its CTE value changed to $10.68 \times 10^{-6}/°$ C. Both CTE values are quite good for building solid oxide fuel cell stacks.

Example 5

To 10 grams of the Corning 4060 paste of Example 1, 10 grams of the barium titanate paste of Example 2 was added and mixed to make the sealant mixture paste. The sealant application, process method and conditions were similar to that described in Example 2, except that the sealing process was accomplished at about 950° C. A bar was also prepared from this sealant for CTE measurement. The measured CTE value for the as-fired bar (fired to 950° C. for 30 minutes and cooled down) was $10.46 \times 10^{-6}/°$ C. After further annealing at 800° C. for 550 hours, the measured CTE value was $12.35 \times 10^{-6}/°$ C.

Example 6

To 10 grams of the Corning 4060 paste of Example 1, 2.5 grams of the barium titanate paste of Example 2 was added and mixed to make the sealant mixture paste. The paste application, process method and conditions were similar to that described in Example 2. A bar was also prepared from this sealant for CTE measurement. The measured CTE value for the as-fired bar (fired to 900° C. for 30 minutes and cooled down) was $10.18 \times 10^{-6}/°$ C. After further annealing at 800° C. for 550 hours, the measured CTE value was $10.23 \times 10^{-6 \circ}$ C.

Example 7

20 grams of Corning 4060 glass powder, 5 grams of strontium titanate powder, and 1 grams of 8 mol % yttria stabilized zirconium oxide powder were blended and mixed with 8 grams of a solvent/binder system (Alpha-terpineol/ Heraeus V-006, 50:50 ratio) to make a sealant mixture. The sealant application, process method and conditions were similar to that described in Example 2.

Example 8

10 grams of Corning 3130 glass powder was blended with 4.6 grams of barium titanate powder and 0.8 grams of 8 mol % yttria stabilized zirconium oxide powder in agate mortar to make the sealant mixture. The sealant can be applied to the places in the fuel cell stack 100 to be sealed and then heated to a temperature higher than the softening point of the glass, e.g., about 800° C., in the sealant mixture to make the seal.

Example 9

Four lap-joint coupons were constructed from E-BRITE and SOFC electrolyte/anode bilayer strips with the sealant of Example 2 sandwiched between. The lap-joint area for these coupons was about 5 mm×8 mm and the joint thickness was about 150 micrometer. Two coupons were joined to the electrolyte side of the bilayer and the other two to the anode side. These coupons were fired using the schedule described in Example 2. After sealing/joining (fired to 900° C. for 30 min. and then at 800° C. for 10 hours), the coupons were cooled down for visual bond integrity check and found all bonded very well. They were then subject to thermal cycling experiments from room temperature to 800° C., held for an hour, and then cooled down, for a total of 20 times. At the end of the experiments all four coupons were still bonded well. A manual pull test was conducted on them, and significant force (estimated several pounds) was required to pull these relatively small lap-joint coupons apart.

Example 10

Two lap-joint coupons were constructed from E-BRITE strips with the sealant of Example 2 sandwiched between. The lap-joint area for the coupons was about 6 mm×8 mm and the joint thickness was about 150 micrometer. The coupons were fired using the schedule described in Example 2. After sealing/joining (fired to 900° C. for 25 min. and then at 800° C. for 10 hours), the coupons were cooled down for visual bond integrity check and found all bonded very well. They then underwent further heat treatment at 800° C. for 100 hours. A pulling test was conducted on them, and significant force (up to 6.2 pounds as measured by a scale) was required to pull the relatively small lap-joint coupons apart.

Example 11

A parallelepiped box was fabricated by brazing two squares of 400-series stainless steel sheet, having a thickness of 0.017 inch and side length of 1 inch, with smaller pieces of the same sheet so that all four sides of the box being 0.034 inch high were open. A piece of tubing was also brazed to the one sheet of the box that was suitably drilled to allow fluid introduction. The four open sides of the box having a gap height of 34 mils were then sealed with the sealant mixture paste and fired according to Example 2 to create a box with the four, previously open sides, sealed with the sealant mixture of the present invention. The resultant was connected to a nitrogen gas stream from a controlled gas source at room temperature and was found to be leak free.

The sealed box, or pressure vessel, was subsequently pressure tested at 800° C. The pressure vessel was tested for 120 hours at 0.100 psig and subsequently 100 hours at 0.250 psig at 800° C. It was then subjected to 27 thermal cycles between 800° C. and 250° C. (90-minute rams and 30-minute dwells) while being kept under at 0.250 psig pressure without leakage. The vessel was cooled down to room temperature and inspected after 27 thermal cycles and the sealant looked very similar to the way it appeared prior to the pressure and thermal cycling testing. There was no evidence of cracking or sealant displacement.

The vessel was heated up again to 800° C. and subjected to the following pressure testing sequence. It survived 157 hours of testing at 0.500 psig pressure without leakage. The vessel was subsequently held for 24 hours at each 0.75 and 1.00 psig, again without leakage. The vessel remained leak free to 2 psig, the pressure being increased by increments of 0.25 psig every 24 hours.

After testing 2 psig, the pressure was increased daily in 0.50 psig increments. At 5 psig, the vessel was still leak free, with the pressure system loosing only about 1.2% of pressure per hour. The vessel contained the pressure at 6.5 psig, but finally developed a pinhole leak at 7 psig with the pressure loss being about 28% of pressure per hour.

In summary the sealant composition of the present invention can easily contain a pressure of 6.5 psig. The containment of this high pressure at 800° C. without leakage is undoubtly due to the reinforcement that the elongated single crystal grains provide to the glass matrix.

It should be understood, of course, that the foregoing relates to preferred embodiments of the invention and that modifications may be made without departing from the spirit and scope of the invention as set forth in the following claims.

We claim:

1. A process for sealing a fuel cell stack, comprising the steps of:
    forming a sealant mixture paste by mixing a glass precursor and a composite microstructure forming agent, wherein the composite microstructure forming agent comprises a titanate selected from the group consisting of barium titanate, strontium titanate, calcium titanate, their solid solutions and mixtures thereof;
    applying the sealant mixture paste to a selected location of the fuel cell stack; and
    transforming the sealant mixture paste into a composite sealant material to seal the selected sealant location wherein the composite sealant material comprises a glass matrix phase and a reinforcing phase.

2. The process of claim 1, wherein the glass precursor to the composite microstructure forming agent is present in a weight ratio of between about 1 to 2 and 30 to 1.

3. The process of claim 2, wherein the forming step further comprises mixing a solvent and/or binder into the sealant mixture paste, wherein the solvent and/or binder comprises about 5% or 50% of the paste by weight.

4. The process of claim 1, wherein the step of transforming comprises applying heat to the sealant mixture paste at a temperature range of about 700–950° C. so that the glass precursor reacts with the composite microstructure forming agent to form elongated grains.

5. The process of claim 4, wherein the reinforcing phase comprises a plurality of elongated grains.

6. The process of claim 5, wherein the elongated grain are distributed into the glass matrix so as to form a network of elongated grains.

7. The process of claim 6, wherein the elongated grains have a length in the range of about 2–200 micrometers and an aspect ratio in the range of about 2–100.

8. The process of claim 3, further comprises curing the sealant mixture paste prior to transforming into the composite sealant.

9. The process of claim 8, wherein the curing step comprises applying heat to the sealant mixture paste at a temperature range of about 25–600° C. so that the solvent and/or binder is removed from the sealant mixture paste.

10. A process for sealing a fuel cell stack, comprising the steps of:
    forming a sealant mixture paste by mixing a glass precursor and a composite microstructure forming agent, wherein the sealant mixture paste comprises non-reactive fillers selected from the group costing of metal powders, ceramic powders and ceramic fibers;
    applying the sealant mixture paste to a selected location of the fuel cell stack; and
    transforming the sealant mixture paste into a composite sealant material to seal the selected sealant location wherein the composite sealant material comprises a glass matrix phase and a reinforcing phase.

11. A sealant material for sealing a fuel cell stack comprising:
    a glass matrix phase; and
    a plurality of elongated grains of a reinforcing phase distributed into the glass matrix phase wherein the elongated grains are formed as a result of a reaction between a glass precursor material and a composite microstructure forming material selected from the group consisting of barium titanate, strontium titanate, calcium titanate, and mixtures thereof.

12. The sealant material of claim 11, wherein a weight ratio of the glass precursor material to the composite structure forming material is between about 1 to 2 and 30 to 1.

13. The sealant material of claim 11, wherein the reaction between the glass precursor material and the composite structure forming material at a temperature range of about 700–950° C.

14. The sealant material of claim 11, wherein the elongated grains are distributed into the glass matrix so as to form a network of elongated grains.

15. The sealant material of claim 11, wherein the elongated grains have a length in the range of about 2–200 micrometers and an aspect ratio in the range of about 2–100.

\* \* \* \* \*